US012731127B1

(12) United States Patent
Mullen et al.

(10) Patent No.: US 12,731,127 B1
(45) Date of Patent: Sep. 8, 2026

(54) LOCKING FEATURES FOR POWERED CARDS AND DEVICES

(71) Applicant: Dynamics Inc., Cheswick, PA (US)

(72) Inventors: Jeffrey D. Mullen, Glenshaw, PA (US); Bruce S. Cloutier, Jeannette, PA (US); Michael T. Wallace, Payson, AZ (US)

(73) Assignee: Dynamics Inc., Cheswick, PA (US)

( * ) Notice: Subject to any disclaimer, the term of this patent is extended or adjusted under 35 U.S.C. 154(b) by 0 days.

(21) Appl. No.: 15/591,025

(22) Filed: May 9, 2017

Related U.S. Application Data

(63) Continuation of application No. 13/289,310, filed on Nov. 4, 2011, now Pat. No. 9,646,240.

(60) Provisional application No. 61/410,468, filed on Nov. 5, 2010.

(51) Int. Cl.
*G06Q 20/34* (2012.01)

(52) U.S. Cl.
CPC .................................. *G06Q 20/354* (2013.01)

(58) Field of Classification Search
CPC ........ G07F 7/10; G07F 7/1008; G07F 7/0806; G07F 7/0813; G07F 7/082; G07F 7/0826
USPC .............. 235/375, 435, 492; 340/10.1, 572.1
See application file for complete search history.

(56) References Cited

U.S. PATENT DOCUMENTS 4,353,064 A 10/1982 Stamm
4,394,654 A 7/1983 Hofmann-Cerfontaine
4,614,861 A 9/1986 Pavlov et al.
4,667,087 A 5/1987 Quintana
4,701,601 A 10/1987 Francini et al.
4,720,860 A 1/1988 Weiss
4,786,791 A 11/1988 Hodama
4,791,283 A 12/1988 Burkhardt
4,797,542 A 1/1989 Hara
5,038,251 A 8/1991 Sugiyama et al.
5,065,155 A 11/1991 Oogita et al.
5,168,520 A 12/1992 Weiss
5,237,614 A 8/1993 Weiss
5,276,311 A 1/1994 Hennige
5,347,580 A 9/1994 Molva et al.
(Continued)

FOREIGN PATENT DOCUMENTS

JP 05210770 A 8/1993
WO WO9852735 11/1998
(Continued)

OTHER PUBLICATIONS

U.S. Appl. No. 60/594,300, Poidomani et al.
(Continued)

*Primary Examiner* — Laura A Gudorf
(74) *Attorney, Agent, or Firm* — Morris Law Group; Robert W. Morris

(57) ABSTRACT

Cards may be provided with locked modes of operation. A card may, for example, monitor a particular sequence of one or more manual inputs while the card transitions from a low-power mode of operation to a locked mode of operation. The card may store the particular sequence of the one or more manual inputs as a locking code. The card may ignore subsequent manual inputs during the locked mode of operation until the locking code is reentered into the card. Once the locking code is reentered into the card, the card may again become reactive to manual inputs received by the card.

9 Claims, 7 Drawing Sheets

(56) References Cited

U.S. PATENT DOCUMENTS 5,361,062 A 11/1994 Weiss et al.
5,412,199 A 5/1995 Finkelstein et al.
5,434,398 A 7/1995 Goldberg
5,434,405 A 7/1995 Finkelstein et al.
5,478,994 A 12/1995 Rahman
5,479,512 A 12/1995 Weiss
5,484,997 A 1/1996 Haynes
5,485,519 A 1/1996 Weiss
5,585,787 A 12/1996 Wallerstein
5,591,949 A 1/1997 Bernstein
5,608,203 A 3/1997 Finkelstein et al.
5,623,552 A 4/1997 Lane
5,657,388 A 8/1997 Weiss
5,834,747 A 11/1998 Cooper
5,834,756 A 11/1998 Gutman et al.
5,856,661 A 1/1999 Finkelstein et al.
5,864,623 A 1/1999 Messina et al.
5,907,142 A 5/1999 Kelsey
5,913,203 A 6/1999 Wong et al.
5,937,394 A 8/1999 Wong et al.
5,955,021 A 9/1999 Tiffany, III
5,956,699 A 9/1999 Wong et al.
6,025,054 A 2/2000 Tiffany, III
6,045,043 A 4/2000 Bashan et al.
6,076,163 A 6/2000 Hoffstein et al.
6,085,320 A 7/2000 Kaliski
6,095,416 A 8/2000 Grant et al.
6,130,621 A 10/2000 Weiss
6,145,079 A 11/2000 Mitty et al.
6,157,920 A 12/2000 Jakobsson et al.
6,161,181 A 12/2000 Haynes, III et al.
6,176,430 B1 1/2001 Finkelstein et al.
6,182,894 B1 2/2001 Hackett et al.
6,189,098 B1 2/2001 Kaliski
6,199,052 B1 3/2001 Mitty et al.
6,206,293 B1 3/2001 Gutman et al.
6,240,184 B1 5/2001 Huynh et al.
6,241,153 B1 6/2001 Tiffany, III
6,256,873 B1 7/2001 Tiffany, III
6,269,163 B1 7/2001 Rivest et al.
6,286,022 B1 9/2001 Kaliski et al.
6,308,890 B1 10/2001 Cooper
6,313,724 B1 11/2001 Osterweil
6,389,442 B1 5/2002 Yin et al.
6,393,447 B1 5/2002 Jakobsson et al.
6,411,715 B1 6/2002 Liskov et al.
6,446,052 B1 9/2002 Juels
6,460,141 B1 10/2002 Olden
6,592,044 B1 7/2003 Wong et al.
6,607,127 B2 8/2003 Wong
6,609,654 B1 8/2003 Anderson et al.
6,631,849 B2 10/2003 Blossom
6,655,585 B2 12/2003 Shinn
6,681,988 B2 1/2004 Stack et al.
6,705,520 B1 3/2004 Pitroda et al.
6,755,341 B1 6/2004 Wong et al.
6,764,005 B2 7/2004 Cooper
6,769,618 B1 8/2004 Finkelstein
6,805,288 B2 10/2004 Routhenstein et al.
6,811,082 B2 11/2004 Wong
6,813,354 B1 11/2004 Jakobsson et al.
6,817,532 B2 11/2004 Finkelstein
6,873,974 B1 3/2005 Schutzer
6,902,116 B2 6/2005 Finkelstein
6,970,070 B2 11/2005 Juels et al.
6,980,969 B1 12/2005 Tuchler et al.
6,985,583 B1 1/2006 Brainard et al.
6,991,155 B2 1/2006 Burchette, Jr.
7,013,030 B2 3/2006 Wong et al.
7,035,443 B2 4/2006 Wong
7,039,223 B2 5/2006 Wong
7,044,394 B2 5/2006 Brown
7,051,929 B2 5/2006 Li
7,083,094 B2 8/2006 Cooper
7,100,049 B2 8/2006 Gasparini et al.
7,100,821 B2 9/2006 Rasti
7,111,172 B1 9/2006 Duane et al.
7,114,652 B2 10/2006 Moullette et al.
7,136,514 B1 11/2006 Wong
7,140,550 B2 11/2006 Ramachandran
7,163,153 B2 1/2007 Blossom
7,195,154 B2 3/2007 Routhenstein
7,197,639 B1 3/2007 Juels et al.
7,219,368 B2 5/2007 Juels et al.
7,225,537 B2 6/2007 Reed
7,225,994 B2 6/2007 Finkelstein
7,246,752 B2 7/2007 Brown
7,298,243 B2 11/2007 Juels et al.
7,334,732 B2 2/2008 Cooper
7,337,326 B2 2/2008 Palmer et al.
7,346,775 B2 3/2008 Gasparini et al.
7,350,701 B2 4/2008 Miyashita
7,356,696 B1 4/2008 Jakobsson et al.
7,357,319 B1 4/2008 Lin et al.
7,359,507 B2 4/2008 Kaliski
7,360,688 B1 4/2008 Harris
7,363,494 B2 4/2008 Brainard et al.
7,380,710 B2 6/2008 Brown
7,398,253 B1 7/2008 Pinnell
7,404,087 B2 7/2008 Teunen
7,424,570 B2 9/2008 D'Albore et al.
7,427,033 B1 9/2008 Roskind
7,454,349 B2 11/2008 Teunen et al.
7,461,250 B1 12/2008 Juels et al.
7,461,399 B2 12/2008 Juels et al.
7,472,093 B2 12/2008 Juels
7,472,829 B2 1/2009 Brown
7,494,055 B2 2/2009 Brainard et al.
7,502,467 B2 3/2009 Brainard et al.
7,502,933 B2 3/2009 Jakobsson et al.
7,503,485 B1 3/2009 Routhenstein
7,516,492 B1 4/2009 Nisbet et al.
7,523,301 B2 4/2009 Nisbet et al.
7,530,495 B2 5/2009 Cooper
7,532,104 B2 5/2009 Juels
7,543,739 B2 6/2009 Brown et al.
7,559,464 B2 7/2009 Routhenstein
7,562,221 B2 7/2009 Nystrom et al.
7,562,222 B2 7/2009 Gasparini et al.
7,580,898 B2 8/2009 Brown et al.
7,584,153 B2 9/2009 Brown et al.
7,591,426 B2 9/2009 Osterweil et al.
7,591,427 B2 9/2009 Osterweil
7,602,904 B2 10/2009 Juels et al.
7,631,804 B2 12/2009 Brown
7,639,537 B2 12/2009 Sepe et al.
7,641,124 B2 1/2010 Brown et al.
7,660,902 B2 2/2010 Graham et al.
7,784,687 B2 8/2010 Mullen et al.
7,793,851 B2 9/2010 Mullen
7,828,207 B2 11/2010 Cooper
7,828,220 B2 11/2010 Mullen
7,931,195 B2 4/2011 Mullen
7,954,705 B2 6/2011 Mullen
D643,063 S 8/2011 Mullen et al.
8,011,577 B2 9/2011 Mullen et al.
8,020,775 B2 9/2011 Mullen et al.
8,066,191 B1 11/2011 Cloutier et al.
D651,237 S 12/2011 Mullen et al.
D651,238 S 12/2011 Mullen et al.
8,074,877 B2 12/2011 Mullen et al.
D651,644 S 1/2012 Mullen et al.
D652,075 S 1/2012 Mullen et al.
D652,076 S 1/2012 Mullen et al.
D652,448 S 1/2012 Mullen et al.
D652,449 S 1/2012 Mullen et al.
D652,450 S 1/2012 Mullen et al.
D652,867 S 1/2012 Mullen et al.
D653,288 S 1/2012 Mullen et al.
8,172,148 B1 5/2012 Cloutier et al.
D665,022 S 8/2012 Mullen et al.
D665,447 S 8/2012 Mullen et al.
D666,241 S 8/2012 Mullen et al.
8,282,007 B1 10/2012 Cloutier et al.

(56) References Cited

U.S. PATENT DOCUMENTS 8,286,876 B2 10/2012 Mullen et al.
D670,759 S 11/2012 Mullen et al.
8,302,872 B2 11/2012 Mullen
D672,389 S 12/2012 Mullen et al.
8,322,623 B1 12/2012 Mullen et al.
D674,013 S 1/2013 Mullen et al.
8,348,172 B1 1/2013 Cloutier et al.
8,382,000 B2 2/2013 Mullen et al.
8,393,545 B1 3/2013 Mullen et al.
8,393,546 B1 3/2013 Yen et al.
8,413,892 B2 4/2013 Mullen et al.
8,424,773 B2 4/2013 Mullen et al.
8,459,548 B2 6/2013 Mullen et al.
D687,094 S 7/2013 Mullen et al.
8,485,437 B2 7/2013 Mullen et al.
8,511,574 B1 8/2013 Yen et al.
8,517,276 B2 8/2013 Mullen et al.
8,523,059 B1 9/2013 Mullen et al.
8,561,894 B1 10/2013 Mullen et al.
8,573,503 B1 11/2013 Cloutier et al.
8,579,203 B1 11/2013 Lambeth et al.
8,590,796 B1 11/2013 Cloutier et al.
8,602,312 B2 12/2013 Cloutier et al.
8,608,083 B2 12/2013 Mullen et al.
8,622,309 B1 1/2014 Mullen et al.
8,668,143 B2 3/2014 Mullen et al.
8,727,219 B1 5/2014 Mullen
8,733,638 B2 5/2014 Mullen et al.
8,746,579 B1 6/2014 Cloutier et al.
8,757,483 B1 6/2014 Mullen et al.
8,757,499 B2 6/2014 Cloutier et al.
8,814,050 B1 8/2014 Mullen et al.
8,875,999 B2 11/2014 Mullen et al.
8,881,989 B2 11/2014 Mullen et al.
8,931,703 B1 1/2015 Mullen et al.
8,973,824 B2 3/2015 Mullen et al.
9,004,368 B2 4/2015 Mullen et al.
9,010,630 B2 4/2015 Mullen et al.
9,053,398 B1 6/2015 Cloutier
9,064,255 B1 6/2015 Mullen et al.
9,292,843 B1 3/2016 Mullen et al.
9,306,666 B1 4/2016 Zhang et al.
9,329,619 B1 5/2016 Cloutier
9,361,569 B2 6/2016 Mullen et al.
9,373,069 B2 6/2016 Cloutier et al.
9,384,438 B2 7/2016 Mullen et al.
9,547,816 B2 1/2017 Mullen et al.
9,639,796 B2 5/2017 Mullen et al.
9,652,436 B1 5/2017 Yen et al.
9,684,861 B2 6/2017 Mullen et al.
D792,511 S 7/2017 Mullen et al.
D792,512 S 7/2017 Mullen et al.
D792,513 S 7/2017 Mullen et al.
9,697,454 B2 7/2017 Mullen et al.
9,704,088 B2 7/2017 Mullen et al.
9,704,089 B2 7/2017 Mullen et al.
9,727,813 B2 8/2017 Mullen et al.
9,805,297 B2 10/2017 Mullen et al.
9,852,368 B1 12/2017 Yen et al.
9,875,437 B2 1/2018 Cloutier et al.
9,928,456 B1 3/2018 Cloutier et al.
9,953,255 B1 4/2018 Yen et al.
10,022,884 B1 7/2018 Cloutier
10,032,100 B2 7/2018 Mullen et al.
10,055,614 B1 8/2018 Cloutier et al.
10,095,974 B1 10/2018 Mullen et al.
10,169,692 B2 1/2019 Mullen et al.
10,176,419 B1 1/2019 Cloutier et al.
10,181,097 B1 1/2019 Mullen et al.
10,198,687 B2 2/2019 Mullen et al.
10,223,631 B2 3/2019 Mullen et al.
10,255,545 B2 4/2019 Mullen et al.
10,325,199 B2 6/2019 Mullen et al.
10,430,704 B2 10/2019 Mullen et al.
10,467,521 B2 11/2019 Mullen et al.
10,482,363 B1 11/2019 Cloutier et al.
10,496,918 B2 12/2019 Mullen et al.
10,504,105 B2 12/2019 Mullen et al.
10,579,920 B2 3/2020 Mullen et al.
10,693,263 B1 6/2020 Mullen et al.
10,948,964 B1 3/2021 Cloutier
10,997,489 B2 5/2021 Mullen et al.
11,062,195 B2 7/2021 Mullen
11,144,909 B1 10/2021 Mullen et al.
11,238,329 B2 2/2022 Mullen et al.
11,494,606 B2 11/2022 Mullen et al.
2001/0034702 A1 10/2001 Mockett et al.
2001/0040183 A1 11/2001 Niwata et al.
2001/0047335 A1 11/2001 Arndt et al.
2002/0059114 A1 5/2002 Cockrill et al.
2002/0082989 A1 6/2002 Fife et al.
2002/0096570 A1 7/2002 Wong et al.
2002/0120583 A1 8/2002 Keresman, III et al.
2003/0034388 A1 2/2003 Routhenstein et al.
2003/0052168 A1 3/2003 Wong
2003/0057278 A1 3/2003 Wong
2003/0116635 A1 6/2003 Taban
2003/0152253 A1 8/2003 Wong
2003/0163287 A1 8/2003 Vock et al.
2003/0173409 A1 9/2003 Vogt et al.
2003/0179909 A1 9/2003 Wong et al.
2003/0179910 A1 9/2003 Wong
2003/0226899 A1 12/2003 Finkelstein
2004/0035942 A1 2/2004 Silverman
2004/0054574 A1 3/2004 Kaufman et al.
2004/0133787 A1 7/2004 Doughty
2004/0162732 A1 8/2004 Rahim et al.
2004/0172535 A1 9/2004 Jakobsson
2004/0177045 A1 9/2004 Brown
2005/0043997 A1 2/2005 Sohata et al.
2005/0080747 A1 4/2005 Anderson et al.
2005/0086160 A1 4/2005 Wong et al.
2005/0086177 A1 4/2005 Anderson et al.
2005/0116026 A1 6/2005 Burger et al.
2005/0119940 A1 6/2005 Concilio et al.
2005/0154643 A1 7/2005 Doan et al.
2005/0228959 A1 10/2005 D'Albore et al.
2006/0000900 A1 1/2006 Fernandes et al.
2006/0037073 A1 2/2006 Juels et al.
2006/0041759 A1 2/2006 Kaliski et al.
2006/0085328 A1 4/2006 Cohen et al.
2006/0091223 A1 5/2006 Zellner
2006/0161435 A1 7/2006 Atef et al.
2006/0163353 A1 7/2006 Moulette et al.
2006/0174104 A1 8/2006 Crichton et al.
2006/0196931 A1 9/2006 Holtmanns et al.
2006/0256961 A1 11/2006 Brainard et al.
2006/0261174 A1* 11/2006 Zellner ............ G06K 19/06206 235/492
2007/0034700 A1 2/2007 Poidomani et al.
2007/0114274 A1 5/2007 Gibbs et al.
2007/0124321 A1 5/2007 Szydlo
2007/0152070 A1 7/2007 D'Albore
2007/0152072 A1 7/2007 Frallicciardi et al.
2007/0153487 A1 7/2007 Frallicciardi et al.
2007/0174614 A1 7/2007 Duane et al.
2007/0192249 A1 8/2007 Biffle et al.
2007/0241183 A1 10/2007 Brown et al.
2007/0241201 A1 10/2007 Brown et al.
2007/0246529 A1 10/2007 Lalo et al.
2007/0256123 A1 11/2007 Duane et al.
2007/0281666 A1* 12/2007 Yoshida ................ H04M 1/021 455/411
2007/0291753 A1 12/2007 Romano
2008/0005510 A1 1/2008 Sepe et al.
2008/0008315 A1 1/2008 Fontana et al.
2008/0008322 A1 1/2008 Fontana et al.
2008/0010675 A1 1/2008 Massascusa et al.
2008/0016351 A1 1/2008 Fontana et al.
2008/0019507 A1 1/2008 Fontana et al.
2008/0028447 A1 1/2008 O'Malley et al.
2008/0029607 A1 2/2008 Mullen
2008/0035738 A1 2/2008 Mullen
2008/0040271 A1 2/2008 Hammad et al.

(56) References Cited

U.S. PATENT DOCUMENTS

2008/0040276 A1 2/2008 Hammad et al.
2008/0054068 A1 3/2008 Mullen
2008/0054079 A1 3/2008 Mullen
2008/0054081 A1 3/2008 Mullen
2008/0058016 A1 3/2008 Di Maggio et al.
2008/0059379 A1 3/2008 Ramaci et al.
2008/0065555 A1 3/2008 Mullen
2008/0096326 A1 4/2008 Reed
2008/0126398 A1 5/2008 Cimino
2008/0128515 A1 6/2008 Lorio
2008/0148394 A1 6/2008 Poidomani et al.
2008/0201264 A1 8/2008 Brown et al.
2008/0209550 A1 8/2008 Lorio
2008/0288699 A1 11/2008 Chichierchia
2008/0294930 A1 11/2008 Varone et al.
2008/0302869 A1 12/2008 Mullen
2008/0302876 A1 12/2008 Mullen
2008/0302877 A1 12/2008 Musella et al.
2008/0319911 A1 12/2008 Faith et al.
2009/0013122 A1 1/2009 Sepe et al.
2009/0036147 A1 2/2009 Romano
2009/0046522 A1 2/2009 Sepe et al.
2009/0108064 A1 4/2009 Fernandes et al.
2009/0150295 A1 6/2009 Hatch et al.
2009/0152365 A1 6/2009 Li et al.
2009/0159663 A1 6/2009 Mullen et al.
2009/0159667 A1 6/2009 Mullen et al.
2009/0159668 A1 6/2009 Mullen et al.
2009/0159669 A1 6/2009 Mullen et al.
2009/0159670 A1 6/2009 Mullen et al.
2009/0159671 A1 6/2009 Mullen et al.
2009/0159672 A1 6/2009 Mullen et al.
2009/0159673 A1 6/2009 Mullen et al.
2009/0159680 A1 6/2009 Mullen et al.
2009/0159681 A1 6/2009 Mullen et al.
2009/0159682 A1 6/2009 Mullen et al.
2009/0159688 A1 6/2009 Mullen et al.
2009/0159689 A1 6/2009 Mullen et al.
2009/0159690 A1 6/2009 Mullen et al.
2009/0159696 A1 6/2009 Mullen
2009/0159697 A1 6/2009 Mullen et al.
2009/0159698 A1 6/2009 Mullen et al.
2009/0159699 A1 6/2009 Mullen et al.
2009/0159700 A1 6/2009 Mullen et al.
2009/0159701 A1 6/2009 Mullen et al.
2009/0159702 A1 6/2009 Mullen
2009/0159703 A1 6/2009 Mullen et al.
2009/0159704 A1 6/2009 Mullen et al.
2009/0159705 A1 6/2009 Mullen et al.
2009/0159706 A1 6/2009 Mullen et al.
2009/0159707 A1 6/2009 Mullen et al.
2009/0159708 A1 6/2009 Mullen et al.
2009/0159709 A1 6/2009 Mullen
2009/0159710 A1 6/2009 Mullen et al.
2009/0159711 A1 6/2009 Mullen et al.
2009/0159712 A1 6/2009 Mullen et al.
2009/0159713 A1 6/2009 Mullen et al.
2009/0160617 A1 6/2009 Mullen et al.
2009/0242648 A1 10/2009 Di Sirio et al.
2009/0244858 A1 10/2009 Di Sirio et al.
2009/0253460 A1 10/2009 Varone et al.
2009/0255996 A1 10/2009 Brown et al.
2009/0290704 A1 11/2009 Cimino
2009/0303885 A1 12/2009 Longo
2009/0308921 A1 12/2009 Mullen
2010/0118060 A1* 5/2010 Huang .................... G09G 5/02 345/690
2010/0325721 A1* 12/2010 Bandyopadhyay ... G06F 21/316 726/19
2011/0028184 A1 2/2011 Cooper
2011/0103045 A1* 5/2011 Shay .................. F21V 23/0442 362/157
2011/0272465 A1 11/2011 Mullen et al.
2011/0272466 A1 11/2011 Mullen et al.
2011/0272467 A1 11/2011 Mullen et al.
2011/0272471 A1 11/2011 Mullen
2011/0272472 A1 11/2011 Mullen
2011/0272473 A1 11/2011 Mullen et al.
2011/0272474 A1 11/2011 Mullen et al.
2011/0272475 A1 11/2011 Mullen et al.
2011/0272476 A1 11/2011 Mullen et al.
2011/0272477 A1 11/2011 Mullen et al.
2011/0272478 A1 11/2011 Mullen
2011/0272479 A1 11/2011 Mullen
2011/0272480 A1 11/2011 Mullen et al.
2011/0272481 A1 11/2011 Mullen et al.
2011/0272482 A1 11/2011 Mullen et al.
2011/0272483 A1 11/2011 Mullen et al.
2011/0272484 A1 11/2011 Mullen et al.
2011/0276380 A1 11/2011 Mullen et al.
2011/0276381 A1 11/2011 Mullen et al.
2011/0276416 A1 11/2011 Mullen et al.
2011/0276424 A1 11/2011 Mullen
2011/0276425 A1 11/2011 Mullen
2011/0276436 A1 11/2011 Mullen et al.
2011/0276437 A1 11/2011 Mullen et al.
2011/0278364 A1 11/2011 Mullen et al.
2011/0282753 A1 11/2011 Mullen et al.
2011/0284632 A1 11/2011 Mullen et al.
2011/0284640 A1 11/2011 Mullen et al.
2012/0002691 A1 1/2012 Tao
2012/0028702 A1 2/2012 Mullen et al.
2012/0037709 A1 2/2012 Cloutier et al.
2012/0286037 A1 11/2012 Mullen et al.
2012/0318871 A1 12/2012 Mullen et al.
2012/0326013 A1 12/2012 Cloutier et al.
2013/0020396 A1 1/2013 Mullen et al.
2013/0282573 A1 10/2013 Mullen et al.
2013/0282575 A1 10/2013 Mullen et al.
2014/0054384 A1 2/2014 Cloutier et al.
2015/0186766 A1 7/2015 Mullen et al.
2016/0162713 A1 6/2016 Cloutier et al.
2016/0180209 A1 6/2016 Mullen et al.
2016/0239735 A1 8/2016 Mullen et al.
2016/0283837 A1 9/2016 Mullen et al.
2016/0307085 A1 10/2016 Mullen et al.
2016/0335529 A1 11/2016 Mullen et al.
2016/0342876 A1 11/2016 Mullen et al.
2016/0342877 A1 11/2016 Mullen et al.
2016/0342878 A1 11/2016 Mullen et al.
2016/0342879 A1 11/2016 Mullen et al.
2016/0342880 A1 11/2016 Mullen et al.
2017/0286817 A1 10/2017 Mullen et al.
2017/0300796 A1 10/2017 Mullen et al.
2018/0053079 A1 2/2018 Cloutier et al.
2019/0042903 A1 2/2019 Cloutier et al.
2019/0065928 A1 2/2019 Mullen et al.
2019/0197387 A1 6/2019 Mullen et al.
2019/0340484 A1 11/2019 Mullen et al.
2020/0082383 A1 3/2020 Mullen et al.
2022/0172020 A1 6/2022 Mullen et al.

FOREIGN PATENT DOCUMENTS

WO WO0247019 6/2002
WO WO06066322 6/2006
WO WO06080929 8/2006
WO WO06105092 10/2006
WO WO06116772 11/2006
WO WO08064403 6/2008

OTHER PUBLICATIONS

U.S. Appl. No. 60/675,388, Poidomani et al.
The Bank Credit Card Business. Second Edition, American Bankers Association, Washington, D.C., 1996.
A Day in the Life of a Flux Reversal. http://www.phrack/org/issues.html?issue=37&id=6#article. As viewed on Apr. 12, 2010.
Dynamic Virtual Credit Card Nos. http://homes.cerias.purdue.edu/~jtli/paper/fc07.pdf. As viewed on Apr. 12, 2010.

(56) References Cited

OTHER PUBLICATIONS

English translation of JP 05210770 A.

* cited by examiner

200

400

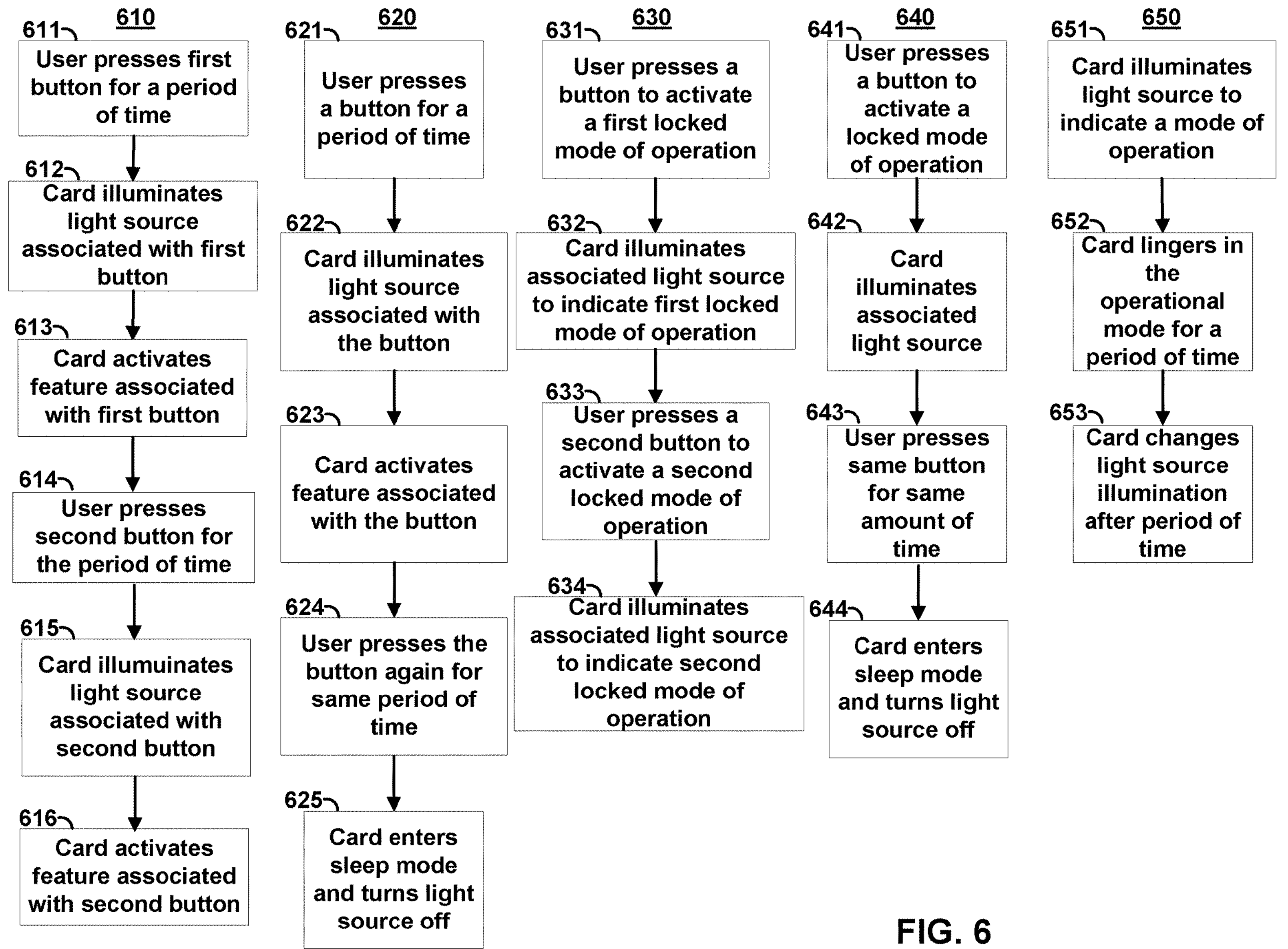
610
611 User presses first button for a period of time
612 Card illuminates light source associated with first button
613 Card activates feature associated with first button
614 User presses second button for the period of time
615 Card illumuinates light source associated with second button
616 Card activates feature associated with second button
620
621 User presses a button for a period of time
622 Card illuminates light source associated with the button
623 Card activates feature associated with the button
624 User presses the button again for same period of time
625 Card enters sleep mode and turns light source off
630
631 User presses a button to activate a first locked mode of operation
632 Card illuminates associated light source to indicate first locked mode of operation
633 User presses a second button to activate a second locked mode of operation
634 Card illuminates associated light source to indicate second locked mode of operation
640
641 User presses a button to activate a locked mode of operation
642 Card illuminates associated light source
643 User presses same button for same amount of time
644 Card enters sleep mode and turns light source off
650
651 Card illuminates light source to indicate a mode of operation
652 Card lingers in the operational mode for a period of time
653 Card changes light source illumination after period of time
FIG. 6

700

LOCKING FEATURES FOR POWERED CARDS AND DEVICES

CROSS-REFERENCE TO RELATED APPLICATION

This application claims the benefit of U.S. Provisional Patent Application No. 61/410,468, titled "LOCKING FEATURES FOR POWERED CARDS AND DEVICES," filed Nov. 5, 2010, which is hereby incorporated by reference herein in its entirety.

BACKGROUND OF THE INVENTION

This invention relates to magnetic cards and devices and associated payment systems.

SUMMARY OF THE INVENTION

A card may include a dynamic magnetic communications device. Such a dynamic magnetic communications device may take the form of a magnetic encoder or a magnetic emulator. A magnetic encoder may change the information located on a magnetic medium such that a magnetic stripe reader may read changed magnetic information from the magnetic medium. A magnetic emulator may generate electromagnetic fields that directly communicate data to a magnetic stripe reader. Such a magnetic emulator may communicate data serially to a read-head of the magnetic stripe reader.

All, or substantially all, of the front as well as the back of a card may be a display (e.g., bi-stable, non bi-stable, LCD, or electrochromic display). Electrodes of a display may be coupled to one or more capacitive touch sensors such that a display may be provided as a touch-screen display. Any type of touch-screen display may be utilized. Such touch-screen displays may be operable of determining multiple points of touch. A barcode, for example, may be displayed across all, or substantially all, of a surface of a card. In doing so, computer vision equipment such as barcode readers may be less susceptible to errors in reading a displayed barcode.

A card may include a number of output devices to output dynamic information. For example, a card may include one or more RFIDs or IC chips to communicate to one or more RFID readers or IC chip readers, respectively. A card may include devices to receive information. For example, an RFID and IC chip may both receive information and communicate information to an RFID and IC chip reader, respectively. A card may include a central processor that communicates data through one or more output devices simultaneously (e.g., an RFID, IC chip, and a dynamic magnetic stripe communications device). The central processor may receive information from one or more input devices simultaneously (e.g., an RFID, IC chip, and dynamic magnetic stripe devices). A processor may be coupled to surface contacts such that the processor may perform the processing capabilities of, for example, an EMV chip. The processor may be laminated over and not exposed such that such a processor is not exposed on the surface of the card.

A card may be provided with a button in which activation of the button causes a code to be communicated through a dynamic magnetic stripe communications device (e.g., the subsequent time a read-head detector on the card detects a read-head). The code may be indicative of, for example, a payment option. The code may be received by the card via manual input (e.g., onto buttons of the card).

A card may be activated for use via manual input (e.g., onto buttons of the card). For example, a button may be actuated (e.g., pressed) and a processor of the card may awaken from a sleep state and may transition into an awake state. Once in the awake state, a processor of a card may detect the presence of a communications device (e.g., a read-head of a magnetic stripe reader). Once detected, a processor of a card may initiate a communications sequence with the magnetic stripe reader.

For example, a processor of a card may communicate one or more tracks of magnetic stripe data after a button is pressed and after the presence of a communications device is detected. The communicated magnetic stripe data may include data that is associated with the actuation of a particular button. For example, a first button of a card may correspond to a first account number and a second button of a card may correspond to a second account number. Depending upon which of the buttons is pressed, the first or second account number and other data (e.g., user data and discretionary data) may be communicated.

A card may be deactivated for operation. For example, a second manual input (e.g., a button press) may occur after a card is activated for operation. Upon detection of a second button press and prior to communicating magnetic stripe data, a processor of a card may transition back into a sleep mode in response to the second button press. A second button press may, for example, occur prior to communicating magnetic stripe data, but instead of transitioning back into a sleep mode of operation, magnetic stripe data may be changed and then communicated (e.g., communicated after a detection of a magnetic card reader has occurred).

A second manual input may occur in error (e.g., a second button press may occur inadvertently before magnetic stripe data may be communicated from the card). A locking feature, therefore, may be programmed into the card to prevent such an occurrence.

Locking features may, for example, be programmed into a card by virtue of a particular manual input sequence (e.g., a particular sequence of button presses that occur during a wake-up sequence of a processor of a card). During the awakening process, a processor of a card may monitor the particular sequence of manual input that caused the processor to become awakened and store such a sequence into memory. Until the same awakening sequence is again detected, the card may remain locked for a particular mode of operation (e.g., communicating a particular set of magnetic stripe information upon detection of the presence of a magnetic card reader).

For example, a processor of a card may detect the manner in which the card was awakened (e.g., a length of time that a button was pressed to awaken the card from a sleep mode). Until the same (or different) button is pressed again with the same duration (thereby unlocking the card), the card may remain locked into a state of operation that it was originally awakened into.

A processor of a card may detect a sequence of button presses and may monitor a duration that each of the buttons was pressed during an awaken sequence. The results of the monitored sequence and duration of button presses may then be stored into memory as an unlocking code. The same sequence of button presses or the same sequence and duration of button presses may then be required by a processor of the card before the card may transition into an unlocked state (e.g., a state that allows an operational mode of the card to be changed via manual input).

A user may transition a card into a mode of operation that allows a locking code and/or an unlocking code to be entered into the card after a processor of the card is awakened from a low-power mode of operation. For example, manual input (e.g., a series of one or more button presses) may transition a processor of a card into a locking/unlocking code programming state from a normal mode of operation. Once operating in the programming state, a processor of a card may record a sequence of manual inputs or a sequence and duration of manual inputs and may then store the recorded sequence as an unlocking code.

A card may provide indicia (e.g., displays or light sources) to indicate whether the card is in a locked or unlocked state. A user of the card may monitor such indicia so as to determine the card's operational state. A card may provide other indicia (e.g., vibration) to indicate whether the card is in a locked or unlocked state.

A card may have multiple buttons. A source of light may be associated with each button. A user may press a button for one period of time (e.g., less than one fifth of a second) to awaken the card and select a feature. A light source associated with that button may turn ON to indicate to the user that a selection has occurred and that the card is ON. A user may press a different button for that period of time to select a different feature. A light source associated with that different button may turn ON to indicate to the user that the selection has occurred and that the card is on. A user may press the previously selected button for that period of time to place the card in a sleep mode. By placing the card in a sleep mode, the light source associated with that button may turn OFF to indicate to the user that the card has turned OFF.

A card may be placed into a locked mode to protect against inadvertent button presses by a processor determining that a button was held down for a second period of time (e.g., approximately 2-4 seconds such as approximately 3 seconds). The source of light next to a button pressed for that second period of time may be operated differently than a source of light next to a button pressed for the first period of time. For example, the light source may blink at a particular frequency to indicate to a user that a selection has occurred, the card is activated, and that the card is in a locked mode. To change a selection in a locked mode, the processor may determine when a different button has been pressed for that second period of time (e.g., approximately 2-4 seconds such as approximately 3 seconds). Accordingly, a user may press a different button for that second period of time and the light source associated with that different button may operate in a second mode of operation (e.g., blink at a particular frequency).

To turn the card OFF in a locked mode, the user may press a selected button for the second period of time. In doing so, the light source associated with that button may turn OFF. A card may turn OFF in a number of situations. For example, a card may time-out after a period of time (e.g., between approximately 5 and 15 minutes such as approximately 8 minutes).

After a period of time in a locked mode or an unlocked mode the light source may be operated in a different mode of operation. In doing so, the card, in both a locked and unlocked mode, may conserve power. For example, in an unlocked mode, the light source associated with a selected button may blink at one frequency after a period of time (e.g., approximately 10 seconds). Before this period of time, the light source may be operated to appear to be emitting a constant source of light. In a locked mode, the light source may blink at a different frequency after a period of rime (e.g., approximately 10 seconds). Before this period of time, the light source may blink at yet a different frequency.

BRIEF DESCRIPTION OF THE DRAWINGS

The principles and advantages of the present invention can be more clearly understood from the following detailed description considered in conjunction with the following drawings, in which the same reference numerals denote the same structural elements throughout, and in which:

FIG. 6 is a flow chart of processes constructed in accordance with the principles of the present invention.

DETAILED DESCRIPTION OF THE INVENTION

Figure 1:
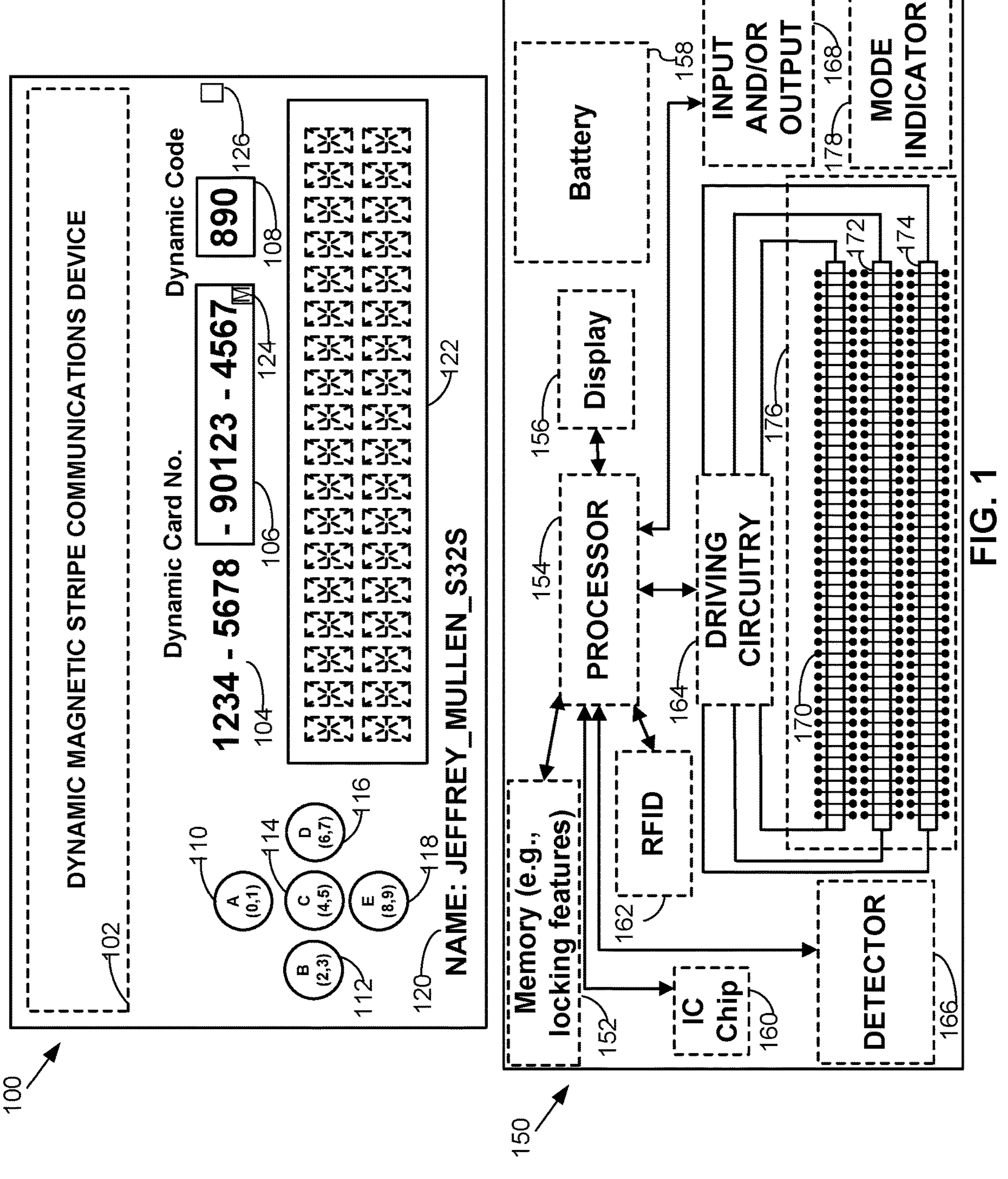
FIG. 1 is an illustration of cards constructed in accordance with the principles of the present invention.

FIG. 1 shows card 100 that may include, for example, a dynamic number that may be entirely, or partially, displayed using a display (e.g., display 106). A dynamic number may include a permanent portion such as, for example, permanent portion 104 and a dynamic portion such as, for example, dynamic portion 106. Card 100 may include a dynamic number having permanent portion 104 and permanent portion 104 may be incorporated on card 100 so as to be visible to an observer of card 100. For example, labeling techniques, such as printing, embossing, laser etching, etc., may be utilized to visibly implement permanent portion 104.

Card 100 may include a second dynamic number that may also be entirely, or partially, displayed via a second display (e.g., display 108). Display 108 may be utilized, for example, to display a dynamic code such as a dynamic security code. Card 100 may also include third display 122 that may be used to display graphical information, such as logos and barcodes. Third display 122 may also be utilized to display multiple rows and/or columns of textual and/or graphical information.

Persons skilled in the art will appreciate that any one or more of displays 106, 108, and/or 122 may be implemented as a bi-stable display. For example, information provided on displays 106, 108, and/or 122 may be stable in at least two different states (e.g., a powered-on state and a powered-off state). Any one or more of displays 106, 108, and/or 122 may be implemented as a non-bi-stable display. For example, the display is stable in response to operational power that is applied to the non-bi-stable display. Other display types, such as LCD or electrochromic, may be provided as well.

Other permanent information, such as permanent information 120, may be included within card 100, which may include user specific information, such as the cardholder's name or username. Permanent information 120 may, for example, include information that is specific to card 100 (e.g., a card issue date and/or a card expiration date). Information 120 may represent, for example, information that includes information that is both specific to the cardholder, as well as information that is specific to card 100.

Card 100 may accept user input data via any one or more data input devices, such as buttons 110-118. Buttons 110-118 may be included to accept data entry through mechanical distortion, contact, or proximity. Buttons 110-118 may be responsive to, for example, induced changes and/or deviations in light intensity, pressure magnitude, or electric and/or magnetic field strength. Such information exchange may then be determined and processed by a processor of card 100 as data input.

Operation of card 100 may be modified through actuation of one or more buttons 110-118. For example, a processor of card 100 may persist in a low-power (e.g., sleep mode) of operation until awakened by a manual input (e.g., button press). While being awakened, a processor of card 100 may monitor a sequence of manual inputs or a sequence and duration of manual inputs received during the awaken sequence. The monitored sequence may then be stored as a locking and/or unlocking code. A processor of card 100 may then transition into a locked mode of operation (e.g., actively searching for a read-head of a magnetic card reader and once found, communicating a particular set of magnetic stripe information via dynamic magnetic stripe communications device 102 while ignoring inadvertent button presses). A locked mode of operation may be indicated, for example, by mode indicator 124 of display 106 and/or mode indicator 126 (e.g., an LED).

Any subsequent manual inputs (e.g., button presses) occurring after a processor of card 100 has transitioned into a locked mode of operation and that do not match a stored unlocking code may be ignored by a processor of card 100. A valid unlocking code received by card 100 may transition a processor of card 100 into an unlocked mode of operation (e.g., a mode of operation that allows a user to change the magnetic stripe information that is communicated by dynamic magnetic stripe communications device 102 of card 100). An unlocked mode of operation may be indicated, for example, by mode indicator 124 of display 106 and/or mode indicator 126 (e.g., an LED).

A programming sequence may be executed, whereby locking codes may be programmed into card 100 while a processor of card 100 is in a normal mode of operation. A first sequence of one or more manual inputs, for example, may transition a processor of card 100 into a programming mode of operation, while any subsequent manual inputs may be monitored and stored in memory as locking and/or unlocking codes.

FIG. 1 shows architecture 150, which may include one or more processors 154. One or more processors 154 may be configured to utilize external memory 152, internal memory of processor 154, or a combination of external memory 152 and internal memory for dynamically storing information, such as executable machine language, related dynamic machine data, locking codes and/or features, and user input data values.

One or more of the components shown in architecture 150 may be configured to transmit information to processor 154 and/or may be configured to receive information as transmitted by processor 154. For example, one or more displays 156 may be coupled to receive data from processor 154. The data received from processor 154 may include, for example, at least a portion of dynamic numbers and/or dynamic codes.

One or more displays 156 may be, for example, touch sensitive and/or proximity sensitive. For example, objects such as fingers, pointing devices, etc., may be brought into contact with displays 156, or in proximity to displays 156. Detection of object proximity or object contact with displays 156 may be effective to perform any type of function (e.g., transmit data to processor 154). Displays 156 may have multiple locations that are able to be determined as being touched, or determined as being in proximity to an object.

Input and/or output devices may be implemented within architecture 150. For example, integrated circuit (IC) chip 160 (e.g., an EMV chip) may be included within architecture 150, that may communicate information with a chip reader (e.g., an EMV chip reader). Radio frequency identification (RFID) module 162 may be included within architecture 150 to enable the exchange of information with an RFID reader.

Other input and/or output devices 168 may be included within architecture 150, for example, to provide any number of input and/or output capabilities. For example, other input and/or output devices 168 may include an audio device capable of receiving and/or transmitting audible information.

Other input and/or output devices 168 may include a device that exchanges analog and/or digital data using a visible data carrier. Other input and/or output devices 168 may include a device, for example, that is sensitive to a non-visible data carrier, such as an infrared data carrier or electromagnetic data carrier. Other input and/or output devices 168 may include light sources and vibration devices used to provide indicia of card operation to a user of the card.

Persons skilled in the art will appreciate that a card (e.g., card 100 of FIG. 1) may, for example, be a self-contained device that derives its own operational power from one or more batteries 158. Furthermore, one or more batteries 158 may be included, for example, to provide operational power for a number of years (e.g., approximately 2-4 years). One or more batteries 158 may be included, for example, as rechargeable batteries.

Mode indicator 178 may be implemented within architecture 150. Mode indicator 178 may include, for example, audible, tactile, and/or visible indicia to indicate a mode of operation of a card. A card (e.g., card 100 of FIG. 1) may, for example, be in a locked state as may be defined by locking features stored within memory 152 and mode indicator 178 (e.g., an LED or display) may indicate such a locked state (e.g., an LED may blink at a particular frequency). A card (e.g., card 100 of FIG. 1) may, for example, be in an unlocked state as may be defined by locking features stored within memory 152 and mode indicator 178 may indicate such an unlocked state (e.g., an LED may blink at a different frequency).

Mode indicator 178 may be provided to indicate a state of operation of a card (e.g., card 100 of FIG. 1). For example, display 156 may provide at least a portion of a dynamic number having a subscript to indicate the operational state of the card. A dynamic number (e.g., $-90123\text{-}4567_L$) may include a subscript "L" to indicate that the card is currently in a locked state. In so doing, for example, magnetic stripe information associated with the locked dynamic number displayed within display 156 may continue to be communicated by a processor of the card until the card is unlocked.

As per another example, a dynamic number (e.g., $-90123\text{-}4567_U$) may include a subscript "U" to indicate that a card (e.g., card 100 of FIG. 1) is currently in an unlocked state. Accordingly, for example, the card may be free to transition into a low-power mode of operation, transition into an alternate account number usage scenario, or any other alternate operations state without first requiring that an unlocking code be entered.

Electromagnetic field generators 170-174 may be included within architecture 150 to communicate information to, for example, a read-head of a magnetic stripe reader via, for example, electromagnetic signals. For example, electromagnetic field generators 170-174 may be included to communicate one or more tracks of electromagnetic data to read-heads of a magnetic stripe reader. Electromagnetic field generators 170-174 may include, for example, a series of electromagnetic elements, where each electromagnetic element may be implemented as a coil wrapped around one or more materials (e.g., a magnetic material and/or a non-magnetic material). Additional materials may be placed outside the coil (e.g., a magnetic material and/or a non-magnetic material).

Electrical excitation by processor 154 of one or more coils of one or more electromagnetic elements via, for example, driving circuitry 164 may be effective to generate electromagnetic fields from one or more electromagnetic elements. One or more electromagnetic field generators 170-174 may be utilized to communicate electromagnetic information to, for example, one or more read-heads of a magnetic stripe reader.

Timing aspects of information exchange between architecture 150 and the various I/O devices implemented within architecture 150 may be determined by processor 154. One or more detectors 166 may be utilized, for example, to sense the proximity, mechanical distortion, or actual contact, of an external device, which in turn, may trigger the initiation of a communication sequence. The sensed presence or touch of the external device may then be processed by a controller (e.g., processor 154), which in turn may direct the exchange of information between a card (e.g., card 100 of FIG. 1) and the external device. The sensed presence, mechanical distortion, or touch of the external device may be effective to, for example, determine the type of device or object detected.

For example, the detection may include the detection of, for example, a read-head housing of a magnetic stripe reader. In response, processor 154 may activate one or more electromagnetic field generators 170-174 to initiate a communications sequence with, for example, one or more read-heads of a magnetic stripe reader. The timing relationships associated with communications to one or more electromagnetic field generators 170-174 and one or more read-heads of a magnetic stripe reader may be provided through use of the detection of the magnetic stripe reader.

Persons skilled in the art will appreciate that processor 154 may provide user-specific and/or card-specific information through utilization of any one or more of buttons 110-118, RFID 162, IC chip 160, electromagnetic field generators 170-174, and other input and/or output devices 168.

Figure 2:
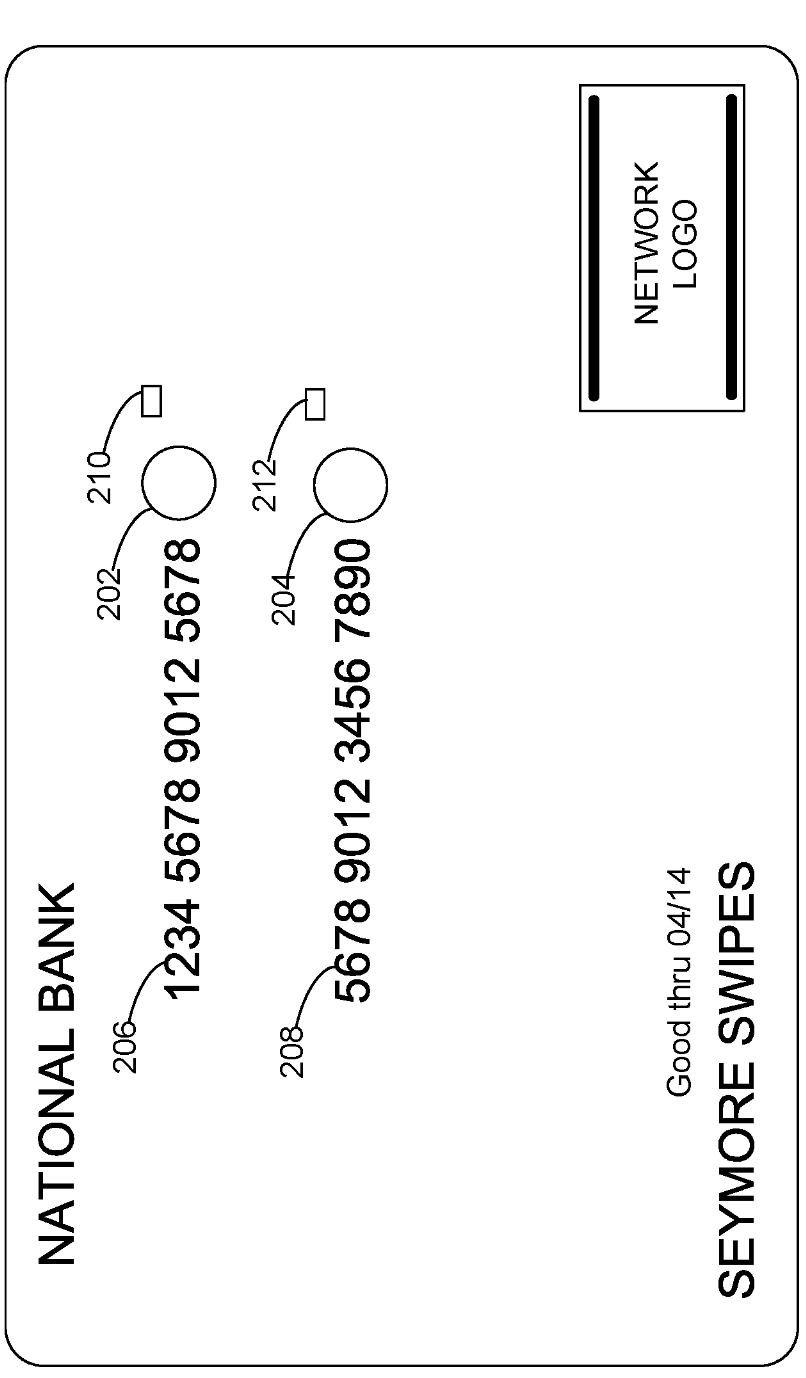
FIG. 2 is an illustration of a card constructed in accordance with the principles of the present invention.

FIG. 2 shows card 200. Card 200 may include buttons 202-204, permanent payment numbers 206-208, and light sources (e.g., LEDs) 210-212. Card 200 may persist within a low-power (e.g., sleep) mode of operation until button 202 and/or 204 are depressed. Such buttons, for example, may be coupled to input ports of a processor such that depression of the one or more buttons 202-204 initiates a mode of operation that may be defined by an executable code sequence (e.g., an interrupt service routine) executed by a processor of card 200.

Such an executable code sequence may, for example, continuously monitor a logic state of buttons 202 and/or 204 while a processor of card 200 is being awakened from a low-power mode of operation. The logic states and associated logic state durations of buttons 202 and/or 204 may then be stored within a memory device of card 200 as a locking and/or unlocking code. Once the locking and/or unlocking code is detected and stored, a processor of card 200 may transition to a locked mode of operation.

For example, button 202 may be depressed for a duration of several seconds (e.g., three seconds) while a processor of card 200 awakens from a low-power mode of operation. A code sequence executed by a processor of card 200 may continuously sample a logic state of button 202 to determine the particular locking and/or unlocking code (e.g., button 202 remains depressed for three seconds) generated during the awaken sequence. A processor of card 200 may then transition into a locked mode of operation that causes payment number 206 (and any other requisite information) to be communicated by card 200 (e.g., communicated after detecting the presence of a read-head of a magnetic stripe reader). The locked state of card 200 may be indicated, for example, by indicia located on card 200 (e.g., the continuous illumination of LED 210).

A processor of card 200 may, for example, awaken into an unlocked mode of operation. For example, button 204 may be pressed for a short duration (e.g., less than half a second) while a processor of card 200 awakens from a low-power mode of operation. A processor of card 200 may then transition into an unlocked mode of operation that may cause payment number 208 (and any other requisite information) to be communicated by card 200 (e.g., communicated after detecting the presence of a read-head of a magnetic stripe reader). The unlocked state of card 200 may be indicated, for example, by indicia located on card 200 (e.g., the intermittent illumination of LED 212).

Persons skilled in the art will appreciate that any sequence of manual inputs may be captured and processed by a processor of card 200 and stored as a locking and/or unlocking code. For example, button 202 may be depressed for a duration (e.g., two seconds) followed by depression of button 204 for a duration (e.g., three seconds). The depression sequence of buttons 202 and 204 may indicate, for example, that the operational state of card 200 is locked for operation using payment number 208 and may be indicated, for example, by continuous illumination of LED 212. Such a locking code may then be stored into a memory of card 200 and recalled during an attempted unlocking event.

An unlocking event may be attempted during any locked mode of operation of card 200. For example, manual input devices (e.g., buttons 202 and 204) may be continuously monitored by a processor of card 200 during a locked mode of operation. Any change in the logic state of any of buttons 202 and/or 204 may trigger a monitoring event, whereby the processor monitors and records the logic state of buttons 202 and 204 for a period of time (e.g., five seconds).

Once the monitoring event terminates, the processor of card 200 may then compare the recorded logic transitions and/or associated logic state durations of buttons 202 and/or 204 to the unlocking code previously stored within a memory of card 200. If a match exists, then the processor of card 200 may transition card 200 into an unlocked mode of operation, which may be indicated, for example, by alternating illuminations of LEDs 210 and 212. If a match does not exist, for example, then the locked mode of operation of card 200 may persist.

Card 200 may transition from one locked state to another. For example, card 200 may be operating in a locked state, whereby a particular locking code associated with button 202 is stored within card 200. Button 204, for example, may then be actuated (e.g., pressed) in a manner that matches the stored locking code. In so doing, for example, card 200 may transition from being locked for operation using payment number 206 to being locked for operation using payment number 208. The change in locked operational modes may be indicated, for example, by changing a continuous illumination of LED 210 to a continuous illumination of LED 212.

After a period of inactivity (e.g., twenty seconds), a processor of card 200 may transition back into a low-power mode of operation. Accordingly, any previously saved locking and/or unlocking codes may be erased. Alternately, any previously saved locking and/or unlocking codes may persist (e.g., may be saved in non-volatile memory) for use during a subsequent operational mode. In so doing, a processor of card 200 may awaken into a locked mode of operation and may provide indicia to indicate such a locked mode of operation.

During an unlocked mode of operation, different and/or additional locking and/or unlocking codes may be programmed into card 200. A sequence of manual inputs (e.g., pressing button 202 and 204 simultaneously for one second) may transition card 200 into a programming mode of operation, which may be indicated, for example, by continuous illumination of LEDs 210 and 212. A programming mode of operation may allow, for example, the programming of a different and/or additional locking and/or unlocking codes into memory of card 200. For example, a user may enter any combination of depressions of button 202 and/or 204 while a processor of card 200 monitors such depressions during a programming mode of operation for a short duration (e.g., a five-second programming duration).

Once programmed, a processor of card 200 may prompt a user to enter the account for which the recently programmed locking and/or unlocking code is to be applied. For example, alternating illuminations of LEDs 210 and 212 may occur after programming is complete to prompt the user to select either of payment number 206 or 208. After selection by the user, for example, one of LEDs 210 or 212 may be continuously illuminated to confirm the selection.

Figure 3:
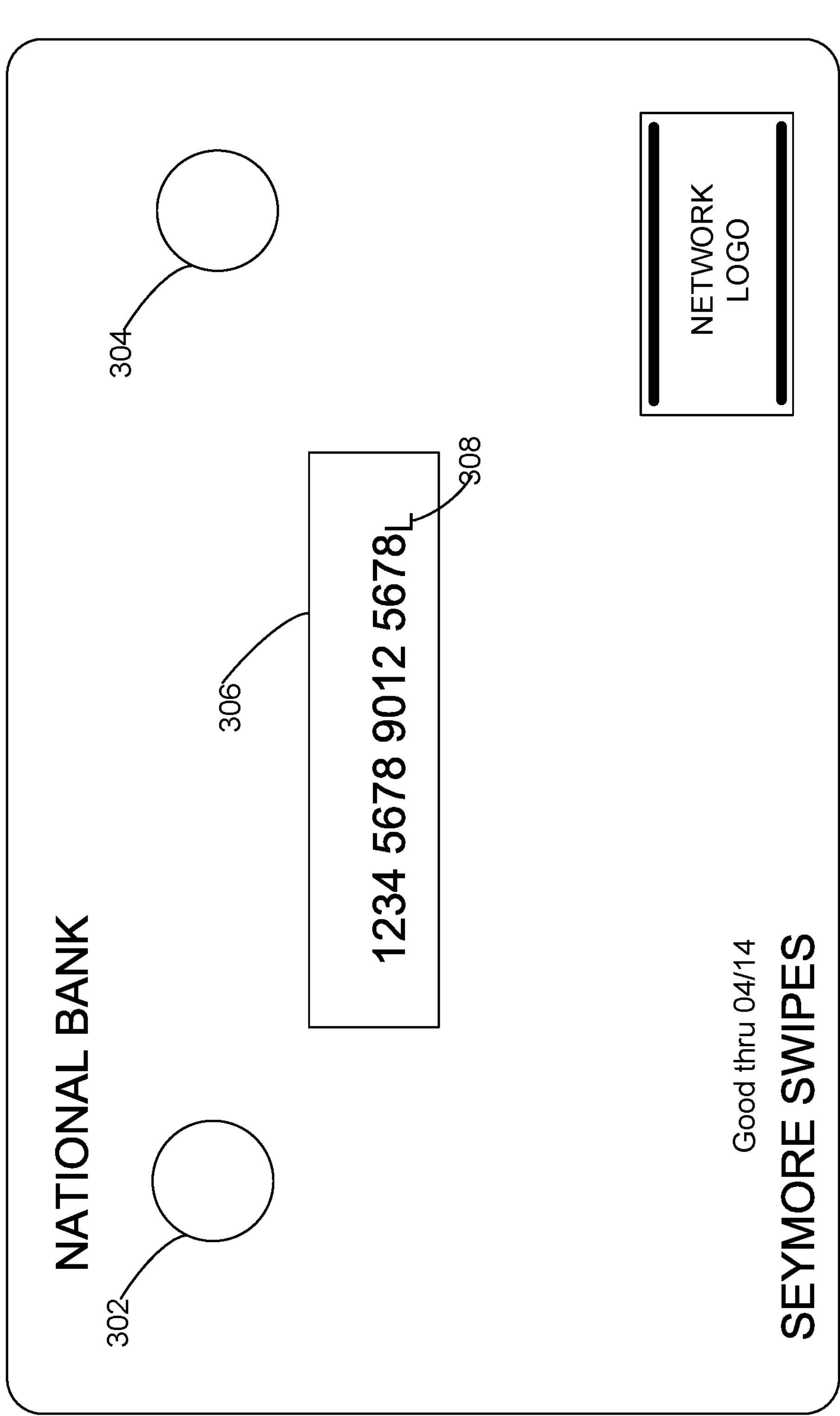
FIG. 3 is an illustration of a card constructed in accordance with the principles of the present invention.

FIG. 3 shows card 300 that may include buttons 302-304 and display 306. A processor of card 300 may persist in a low-power mode of operation, for example, whereby display 306 remains blank and communications (e.g., magnetic stripe communications) may be disabled. Actuation (e.g., depression) of either manual input (e.g., buttons 302 and/or 304) may transition a processor of card 300 from a low-power mode of operation to a programming mode of operation.

Depression of button 302, for example, may cause a first payment number to be displayed within display 306. Depression of button 304, for example, may cause a second payment number to be displayed within display 306. Such a programming mode may enable the locking of card 300, whereby subsequent depression(s) of button 302 or 304 may be detected as a locking code for the displayed payment number.

For example, depression of button 302 may awaken a processor of card 300 from a low-power mode of operation into a programming mode of operation and may further cause a payment number to be displayed within display 306. Subsequent depression(s) of button 302 during the programming mode of operation for a programming period (e.g., five seconds) may be monitored and stored within a memory of card 300 as a locking and/or unlocking code.

Once programmed, subscript 308 may be applied to the displayed payment number to, for example, indicate that the displayed payment number is locked for operation (e.g., subsequent manual inputs to card 300 may be ignored). Any subsequent detection of a communications device (e.g., a magnetic read head) by a processor of card 300 may then cause data (e.g., magnetic stripe data associated with the displayed payment number) to be communicated to the detected read head from card 300.

A processor of card 300 may be awakened into a default programming mode from a low-power mode of operation through manual input (e.g., pressing either of buttons 302 or 304). Display 306 may initially display indicia to the user (e.g., "SELECT ACCOUNT"), which prompts the user to select, through manual input (e.g., depression of button 302 or 304), any one of a number of payment numbers with which to associate a default locking code.

Pressing button 302, for example, may cause display 306 to alternate between displaying a first payment number and displaying another message (e.g., "PRESS BUTTON AGAIN TO LOCK"). If the user presses button 302 again, for example, then the payment number displayed on display 306 may be locked using a default locking code. For example, to unlock card 300 after being locked with a default locking code, a user may press and hold button 302 again for a predetermined amount of time (e.g., two seconds). Once unlocked, display 306 may return to a default unlocked message (e.g., "SELECT ACCOUNT") to allow the user to re-lock card 300 with the same or different payment number.

Alternately, a processor of card 300 may be awakened into a default programming mode, where for example, multiple payment account types may be displayed one at a time on display 306. For example, a first message (e.g., "SELECT LEFT BUTTON FOR VISA CREDIT") and a second message (e.g., "SELECT RIGHT BUTTON FOR M/C DEBIT") may be displayed in alternating fashion on display 306. In response, a user may make an appropriate selection through manual input (e.g., depression of either button 302 or 304) in accordance with his or her wishes. In response, a processor of card 300 may display the locked payment number within display 306. Indicia, such as a subscript "L" may also be displayed to indicate that the displayed payment number is locked. Locked operation of card 300 may be unlocked by entering a default unlocking code (e.g., depressing either of buttons 302 or 304 for two seconds).

Figure 4:
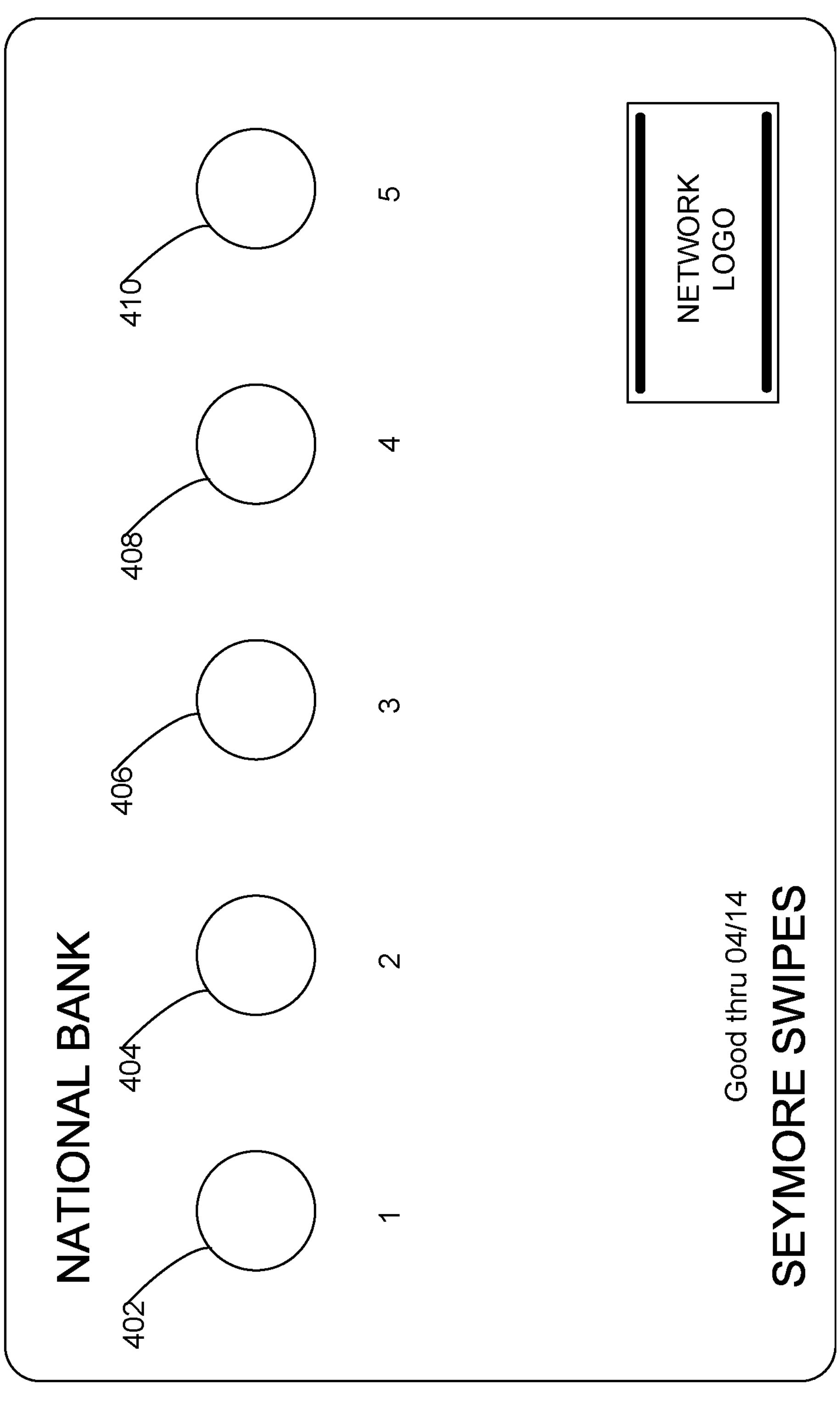
FIG. 4 is an illustration of a card constructed in accordance with the principles of the present invention.

FIG. 4 shows card 400. Card 400 may include manual input devices (e.g., buttons 402-410). Card 400 may be devoid of any other indicia (e.g., displays or light sources). Accordingly, card 400 may provide feedback (e.g., tactile feedback) to provide a user of card 400 with indicia associated with an operational state of card 400.

For example, a processor of card 400 may be awakened from a low-power mode of operation through manual input (e.g., depression of one or more buttons 402-410). In addition, a particular sequence of button depressions (e.g., a 4-digit PIN) may be expected by a processor of card 400 in order to awaken from a low-power mode of operation. If an incorrect PIN is entered, then card 400 may provide tactile feedback (e.g., card 400 may vibrate for one second) to inform the user of the incorrect PIN entry.

Upon entry of a correct PIN, card 400 may provide tactile feedback (e.g., card 400 may vibrate twice for a half-second each time) to inform the user of the correct PIN entry. In addition, a particular set of payment data (e.g., account number, account type, user name, security code, and discretionary data) may be associated with the correctly entered PIN. Card 400 may, therefore, be locked into operation using a particular set of data that may be associated with a particular PIN. Once locked, any subsequent depression of buttons 402-410 may be ineffective to alter operation of card 400.

Alternately, additional PINs may be utilized with card 400. For example, once card 400 is activated for a normal mode of operation via a correct PIN entry, a processor of card 400 may continue to monitor manual inputs (e.g., depression of buttons 402-410) for entry of additional PINs that may be active. In so doing, while an initial mode of operation of card 400 activated through entry of a first valid PIN may ignore all subsequent button presses, card 400 may nevertheless change its mode of operation in response to an entry of a second valid PIN.

For example, card 400 may first be locked into a mode of operation where a particular set of payment data may be communicated (e.g., one or more tracks of magnetic stripe data associated with the particular set of payment data associated with PIN #1 may be communicated to a read head of a magnetic stripe reader upon detection of the magnetic stripe reader). All subsequent manual inputs (e.g., button presses) may be ignored, except a sequence of button depressions that corresponds to one or more alternate PINs that may be associated with card 400.

In so doing, operation of card 400 may be locked into one or more sets of payment data depending upon a particular PIN that may have been entered by a user. Entry of PIN #1, for example, may lock operation of card 400 (e.g., a processor of card 400 may only communicate payment information associated with PIN #1) until entry of a valid PIN #2 is detected. In response, card 400 may lock operation in accordance with a particular set of payment data that may be associated with PIN #2 (e.g., a processor of card 400 may only communicate payment information associated with PIN #2). A subsequent entry of a valid PIN #3 may lock operation of card 400 associated with PIN #3 and so on.

With each PIN entry, card 400 may provide the user with tactile feedback that may correspond to the validity of data entered. For example, a correct PIN entry may be followed by two short bursts of vibration. An incorrect PIN entry, for example, may be followed by one long burst of vibration.

Figure 5:
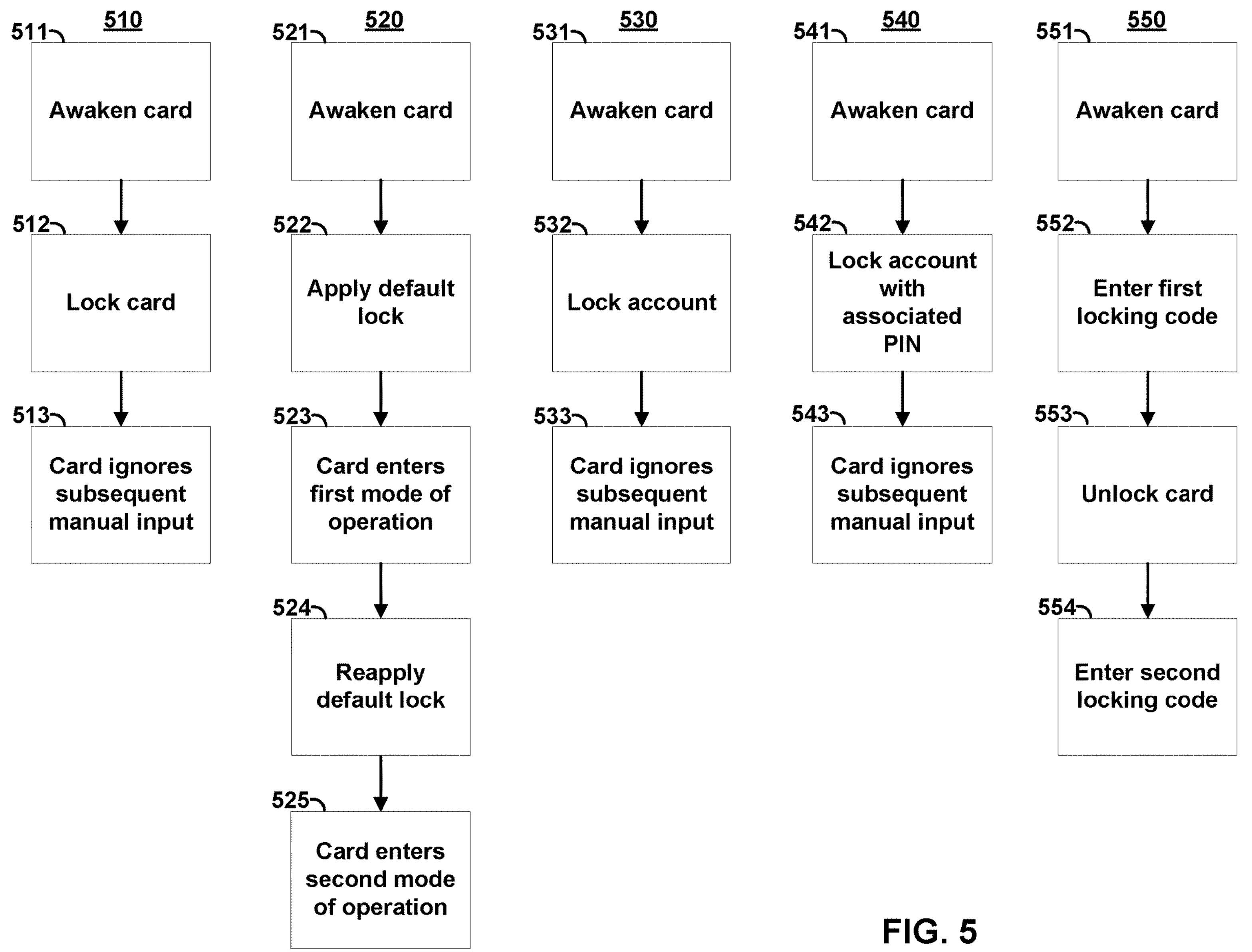
FIG. 5 is a flow chart of processes constructed in accordance with the principles of the present invention.

FIG. 5 shows flow charts 510 through 550. Sequence 510 may include, for example, awakening a processor of a card from a low-power mode of operation (e.g., step 511). For example, a processor of a card may be awakened through manual input (e.g., depression of one or more buttons located on a card). A sequence of one or more button depressions or a sequence of one or more button depressions and associated button press durations may be detected as a locking code during a wake-up sequence of a processor of a card. Accordingly, the card may be locked into an operation associated with the locking code and the locking code may be stored into memory of the card for future reference (e.g., as in step 512). Any subsequent manual inputs (e.g., subsequent button presses) may be ignored (e.g., as in step 513), thereby locking the card into a mode of operation originally selected during the wake-up sequence.

Sequence 520 may include, for example, awakening a processor of a card from a low-power mode of operation (e.g., as in step 521) and applying a default locking code (e.g., as in step 522). For example, a processor of a card may awaken from a low-power mode of operation and may query a user for manual input indicative of a mode of operation. A user may, for example, press a button that may be associated with a particular set of payment data and a processor of the card may apply a default locking code associated with the selection (e.g., a button press having a duration of three seconds).

A processor of a card may enter into a first mode of operation (e.g., as in step 523), whereby only one set of payment data is used during a first mode of operation (e.g., one set of payment data communicated to point-of-sale payment devices for all transactions during the first mode of operation). A user may re-enter the default locking code (e.g., depress a button for three seconds as in step 524).

If the button pressed in step 524 is a different button than was pressed in step 521, then a processor of the card may enter a second mode of locked operation (e.g., as in step 525), whereby a different set of payment data is used during a second mode of operation (e.g., a different set of payment data communicated to point-of-sale payment devices for all transactions during the second mode of operation).

Sequence 530 may include, for example, awakening a processor of a card from a low-power mode of operation (e.g., as in step 531) and cycling through a list of accounts that may be associated with the card. For example, account type descriptions (e.g., VISA-Credit and M/C-Debit) may be sequentially displayed by a card. While a particular account type is displayed, a user may provide manual input (e.g., a button press) to select the displayed account type for use in subsequent transactions (e.g., as in step 532). The card may ignore any subsequent manual input and may continue to use the selected account type during subsequent transactions (e.g., as in step 533).

Sequence 540 may include, for example, awakening a processor of a card from a low-power mode of operation (e.g., as in step 541) and selecting a locked mode of operation by, for example, selecting a PIN that may be associated with a particular set of account data. Upon verification that a PIN is correctly entered, a processor of a card may utilize account data associated with the PIN and may communicate (e.g., communicate payment information associated with the PIN) to point-of-sale devices during a locked mode of operation. The card continues to use payment information associated the PIN, while ignoring subsequent manual inputs that may be received by the card (e.g., as in step 543). Upon receipt of a different valid PIN, however, a processor of a card may enter into a different locked mode of operation, whereby payment information associated with the different PIN is instead used for subsequent point-of-sale transactions.

Sequence 550 may include, for example, awakening a processor of a card from a low-power mode of operation (e.g., as in step 551) and entering a first locking code (e.g., pressing a button for two seconds) to enter a locked mode of operation (e.g., as in step 552). The locking code may be committed to memory within the card. The same locking code (e.g., pressing a button for two seconds) may again be entered (e.g., as in step 553) and compared to the stored locking code to transition the card into an unlocked mode of operation. A second locking code (e.g., pressing a different button for three seconds) may be entered and stored in memory to transition the card into a second locked mode of operation (e.g., as in step 554).

FIG. 6 shows flow charts 610 through 650. Sequence 610 may include, for example, awakening a processor of a card from a low-power mode of operation by pressing a button on a card for a first period of time (e.g., less than one-fifth of a second as in step 611). In step 612, the card may illuminate a light source associated with the pressed button to indicate to the user that a selection has occurred and that the card is activated for use. In step 613, the card may activate a particular feature that may be associated with the pressed button (e.g., a processor of the card may communicate a first set of magnetic stripe data to a magnetic stripe reader after the magnetic stripe reader is detected).

A user may press a second button for the same period of time as the first button was pressed (e.g., less than one-fifth of a second as in step 614). In step 615, a processor of the card may illuminate a light source associated with the second button to indicate to the user that a different selection has occurred and that the card is activated for use. In step 616, a processor of the card may activate a particular feature that may be associated with the second button (e.g., a processor of the card may communicate a second set of magnetic stripe data to a magnetic stripe reader after the magnetic stripe reader is detected).

Sequence 620 may include, for example, pressing a first button on a card for a period of time (e.g., less than one-fifth of a second as in step 621), illuminating a light source associated with the pressed button (e.g., as in step 622), and activating a feature in the card that is associated with the pressed button (e.g., as in step 623). A user may press the same button again for the same amount of time (e.g., less than one-fifth of a second as in step 624) and a processor of the card may enter a sleep mode, whereby the processor enters a low-power mode of operation, deactivates the previously activated feature, and darkens the light source previously illuminated (e.g., as in step 625).

Sequence 630 may include, for example, pressing a button on a card for an extended amount of time (e.g., 2-4 seconds such as approximately 3 seconds as in step 631) to activate a first locked mode of operation. In step 632, a light source associated with the pressed button may be illuminated differently (e.g., the light source may blink at a particular frequency) to indicate that the card is activated for use in a first locked mode of operation (e.g., subsequent inadvertent button presses may be ignored by the card). In step 633, a user may change a first locked mode of operation to a second locked mode of operation by pressing a second button for the same period of time (e.g., 2-4 seconds such as approximately 3 seconds). A processor of the card may then illuminate a light source (e.g., the light source may blink at a particular frequency) associated with the second button to indicate that the card is activated for use in a second locked mode of operation (e.g., subsequent inadvertent button presses may be ignored by the card).

Sequence 640 may include, for example, pressing a button on a card to activate a locked mode of operation (e.g., pressing a button for an extended amount of time as in step 641) and illuminating an associated light source to indicate the locked mode of operation (e.g., as in step 642). The same button may be pressed for the same extended amount of time (e.g., as in step 643) and the card may be deactivated into a low-power mode of operation as signified by darkening the associated light source (e.g., as in step 644).

Sequence 650 may include, for example, illuminating a light source of a card to indicate a particular mode of operation. For example, an unlocked mode of operation may be indicated by a constant illumination of a light source for a period of time (e.g., as in steps 651-652), but a processor of the card may change the illumination after the period of time has expired (e.g., the light source blinks after approximately 10 seconds as in step 653).

As per another example, a locked mode of operation may be indicated by a blinking light source for a period of time (e.g., as in steps 651-652). A processor of the card may then change the illumination after the period of time has expired (e.g., the light source blinks at a different frequency after approximately 10 seconds as in step 653).

Figure 7:
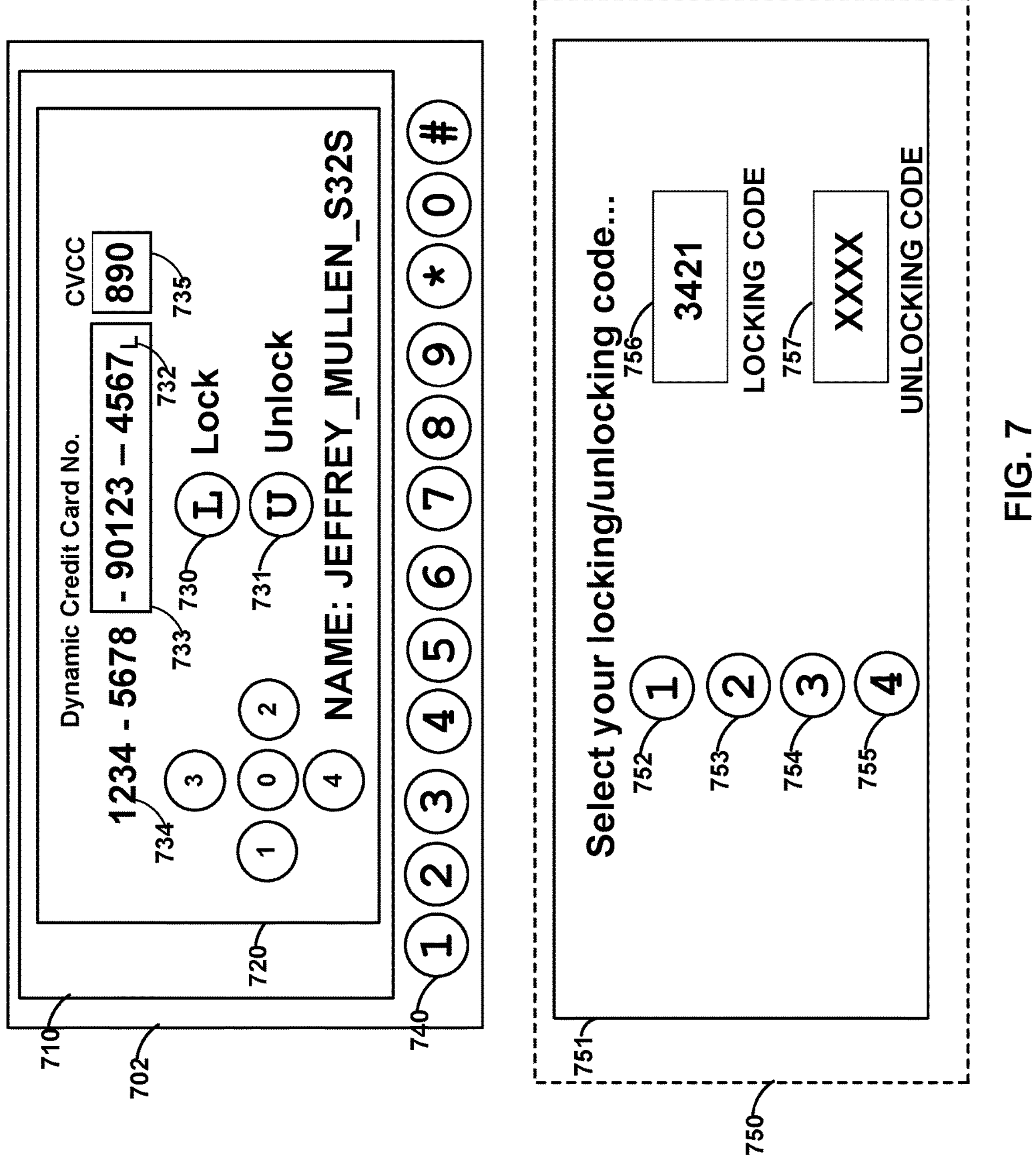
FIG. 7 is an illustration of a device constructed in accordance with the principles of the present invention.

FIG. 7 shows device 700 that may be, for example, a mobile device (e.g., a mobile cellular phone, an e-reader, or an electronic tablet). Any card provided herein may be provided as a virtual card on device 700. Mechanical buttons 740 may be utilized by a user to make selections (e.g., payment account selections associated with a virtual card). Virtual buttons may be included that a user can activate (e.g., by utilizing a touch-screen displaying a virtual card) so that the user can make selections associated with the virtual card. Device 700 may include, for example, housing 702, display 710, virtual card 720, virtual buttons 730 and 731, virtual display 733, and virtual mode indicator 732. Device 700 may communicate to a card reader via electromagnetic signals (e.g., RF signals). Virtual button 730 may, for example, be associated with locking device 700 into a particular mode of operation, which may be indicated by mode indicator 732. Button 731 may, for example, be associated with unlocking device 700, which may be indicated by mode indicator 732.

Display configuration 750 may be provided and may be displayed, for example, on a wireless device such as a wireless telephonic device or a wireless payment card. Configuration 750 may include graphical user interface 751 that may include, for example, virtual button 752, virtual button 753, virtual button 754, and virtual button 755. A user may be provided with the option of selecting certain operational features, which may include an unlocking feature and a locking feature. A user may perform a selection by pressing the virtual button associated with the selection. Information associated with the selection may be provided, for example, to a point-of-sale device (e.g., payment information associated with a locked mode of operation of device 700 may be communicated via a telephonic data communication). A user may select one or more buttons that may allow entry of a locking code, which may then be displayed onto display 756. A user may select one or more buttons that may allow entry of an unlocking code, where each digit may be displayed in a secure fashion via display 757.

Processing in a locked mode of operation (e.g., by pressing button 730 followed by entering a locking code) may, for example, cause a fixed set of payment information to be communicated from device 700. The fixed set of information may, for example, include permanent portion 734 and dynamic portions 733 and 735. The locked mode of operation may, for example, be indicated by mode indicator 732 and may prevent changing payment information associated with device 700 until an unlocking code is entered.

Processing in an unlocked mode of operation (e.g., by pressing button 731 followed by entering an unlocking code that matches a previously entered locking code) may, for example, allow a different set of payment information to be selected and communicated from device 700. The different set of information may, for example, include permanent portion 734 and dynamic portions 733 and 735. The unlocked mode of operation may, for example, be indicated by mode indicator 732.

Persons skilled in the art will also appreciate that the present invention is not limited to only the embodiments described. Instead, the present invention more generally involves dynamic information. Persons skilled in the art will also appreciate that the apparatus of the present invention may be implemented in ways other than those described herein. All such modifications are within the scope of the present invention, which is limited only by the claims that follow.

What is claimed is:

1. The prior art of record fails to teach or fairly suggest, either singularly or in combination thereof, a device comprising each and every one of the following limitations:

A display; and

A button,

Wherein said device is operable to enter a locked mode of operation upon detecting a sequence of one or more depressions of said button, a duration of at least one of said depressions being a period of time of a locking code stored within said device, Said device is operable to enter an unlocked mode of operation upon detecting said sequence, and Said display is operable to indicate said modes of operation.

2. The device of claim 1, further comprising a processor.

3. The device of claim 1, further comprising a light emitting diode (LED).

4. The device of claim 1, further comprising an external memory.

5. The device of claim 1, further comprising at least one of an EMV chip, a radio frequency identification (RFID), and an electromagnetic field generator.

6. The device of claim 1, further comprising a mode indicator.

7. The device of claim 1, further comprising a second button.

8. The device of claim 1, further comprising a second display.

9. The device of claim 1, wherein said period of time is approximately 2-4 seconds.

* * * * *